INVENTOR.
JAMES W. LUCAS

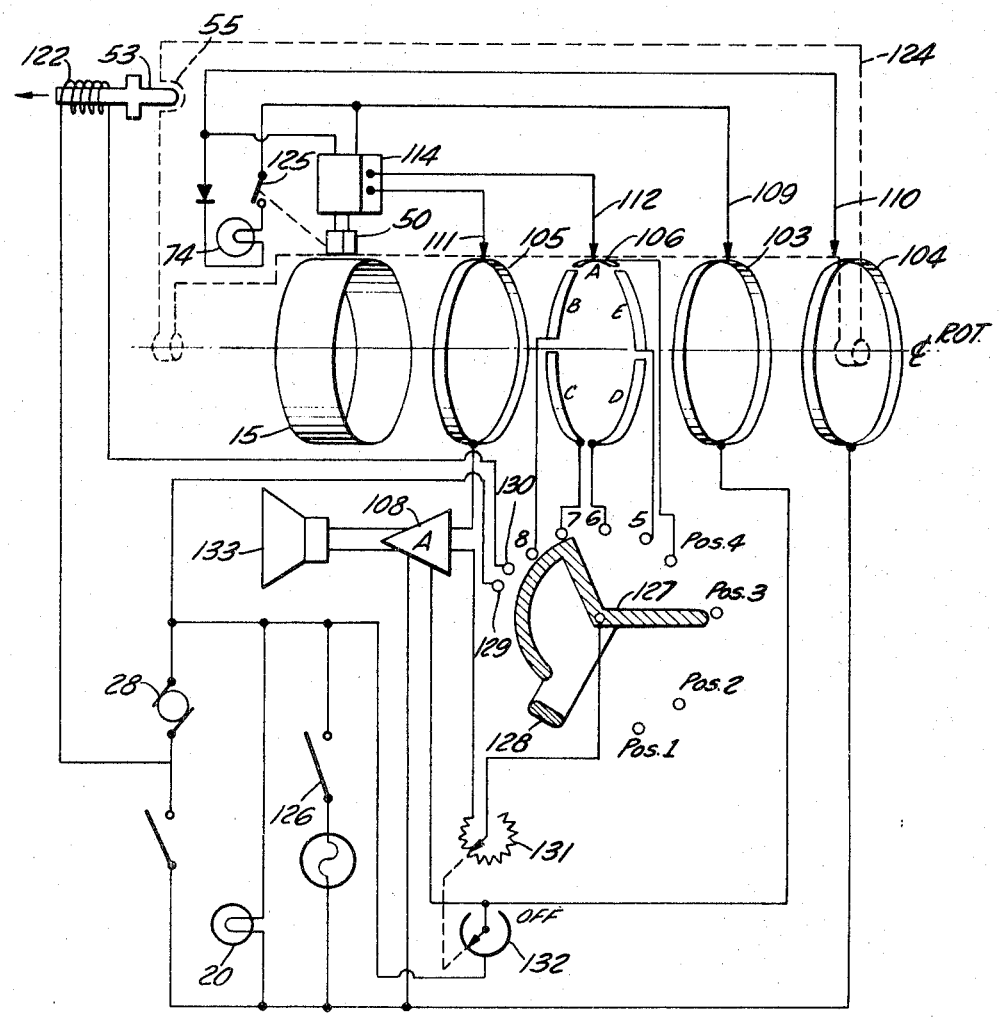

United States Patent Office 3,443,866
Patented May 13, 1969

3,443,866
TEACHING MACHINE
James W. Lucas, 1480 N. Doheny Drive,
Los Angeles, Calif. 90069
Filed Oct. 22, 1965, Ser. No. 500,751
Int. Cl. G03b 25/02
U.S. Cl. 352—101     18 Claims

ABSTRACT OF THE DISCLOSURE

A viewer device for reading out motion or still pictorial information and auditory information recorded on flat film. A transparent rotatable cylinder is provided for supporting the recorded information, a wall of the cylinder passing between a fixed light source and fixed projection system including a rotatable prism. A sound readout head is positioned near the projection lens and can be held stationary or rotated about the axis of the cylinder. Rotation of the prism about its axis causes rotation and advancing of the cylinder in a helical path about its own horizontal axis. The device may be used as a teaching machine wherein axial location of the cylinder is effected by a tray associated therewith. The cylinder may be rotated to a selected pictorial frame by means of a stylus which in turn records the choice of frame selected. Stereoscopic pictures also may be viewed without the requirement of special glasses.

---

The present invention relates to devices for reading out pictorial and auditory information recorded on flat film and, more particularly, to those adapted for programmed instruction. My novel device is intended for use with the types of film sheets described in my copending application, Ser. No. 500,768, filed Oct. 22, 1965.

The primary purpose of programmed instruction is to offer the student a variety of answers to each question asked. As a result of the type of wrong answer chosen, more information of the kind most needed is given, and another choice made. In some cases, it is desirable to keep a record of the selections made by the student. In the case of right answers being chosen, most unnecessary information can be bypassed, so that the bright student's time is better used. In addition, each student can control his own pace.

There are many types of machines available for presenting programmed instruction. These vary from the simple "programmed books" to highly complex systems involving the use of an electronic computer. Most of these devices either are not flexible enough for widespread use or are too expensive for what they do. Highly specialized machines which are limited to the educational market generally price themselves out of that market.

Most of these devices, at least those of reasonable size, can present only written and stationary pictorial material in two dimensions. My novel viewer allows the use of motion sequences in three dimensions, and the use of auditory information associated with still or motion pictures. By providing for the display of many forms of information, my device becomes a useful entertainment viewer as well as a so-called "teaching machine." The market for its use is thus substantially broadened, so that the benefits of mass production techniques can be realized during its manufacture.

A principal object of my invention is to provide a viewer using film which can be inexpensively reproduced in quantity.

A further object of this invention is to have viewer using film which can be stored flat in a standard filing cabinet.

An additional object is to make possible a viewer which will minimize the destructive effects of film wear.

A further object of the present invention is to provide a viewer with random access controllable by teaching machine programs.

A still further object of the present invention is to allow random access by means of punched cards.

Another object of the present invention is the provision of a graphic record of student responses selected during teaching machine programs.

Yet another object of the present invention is to display three-dimensional still or motion pictures so that they may be viewed wihout the use of auxiliary equipment.

An additional object of the present invention is to make possible the use of high fidelity sound with 8 mm. motion pictures.

A further object is the provision of a viewer capable of displaying individual frames while reproducing their associated soundtracks, or selected portions thereof.

An additional object is to make a self-contained viewer which is also usable as a projector.

A still further object is to provide a device which is readily convertible from any one to any other of the above operating modes.

A brief description of my novel viewer is as follows: flat film, with information arranged in the manner indicated in my copending application, is fastened around a transparent cylinder so that the upper and lower edges meet. One wall of the cylinder passes between a fixed light source and a fixed projection system, including an octagonal prism. A sound readout head near the projection lens can be held stationary or rotated about the cylinder axis. Rotation of the octagonal prism about its horizontal axis causes rotation and advancing of the cylinder in a helical path about its own horizontal axis. The pitch of this helix can be changed to accommodate the requirements of the film. Spring-loaded followers allow the helical path to be bypassed for immediate rewinding.

When this device is used as a teaching machine, the axial locator for the cylinder is a tray to which a piece of blank paper is attached. Responses are selected by inserting a pencil into a hole at one of several dozen number locations and pulling the pencil against an indexing stop. This motion rotates the cylinder to the selected frame and records the choice made on the blank paper, providing a complete graphic record of the activities of the student. When a special pencil is used for marking, machine scoring is easily accomplished by checking line records against a master sheet.

When stereoscopic pairs of pictures are to be viewed, a Fresnel lens is used without the normal diffusion viewing screen. A mask is moved out of the way of half the projection lens field, and two pictures approach the lens from behind at slightly different horizontal angles, so that each picture is seen only by the one eye that is aligned with its optical path.

The flat film sheets described in my copending application can be stored in 8½ x 11" envelopes which fit standard filing cabinets. No sprocket holes are used and wear is minimized since there is no relative motion between the film and any contacting surface. Picture and sound information are arranged in columns, and the film is wrapped around a viewing cylinder so that the end of one column joins the beginning of the next column. A continuous spiral is thus created and the cylinder is advanced in a helical path so that all pictorial information passes through the optical centerline of a fixed projection system in sequence. For motion sequences, the pictures are shown through a rotating octagonal prism between the film and the projection lens. Constant speed can thus be used, so that direct readout of soundtracks on the film is possible. High fidelity sound can be reproduced, because the sound readout speed is not necessarily related to the linear speed of the picture information. Indeed, the soundtrack can be played while still frames are being viewed. These modes of operation are possible because the sound readout head can be rotated at different speed from that of the cylinder or can be held stationary while the cylinder moves.

Referring now to the drawings, FIGURE 1 is a perspective view of my novel projector, with the outer case removed.

FIGURE 5 is a schematic diagram of the electrical system.

Figure 1:
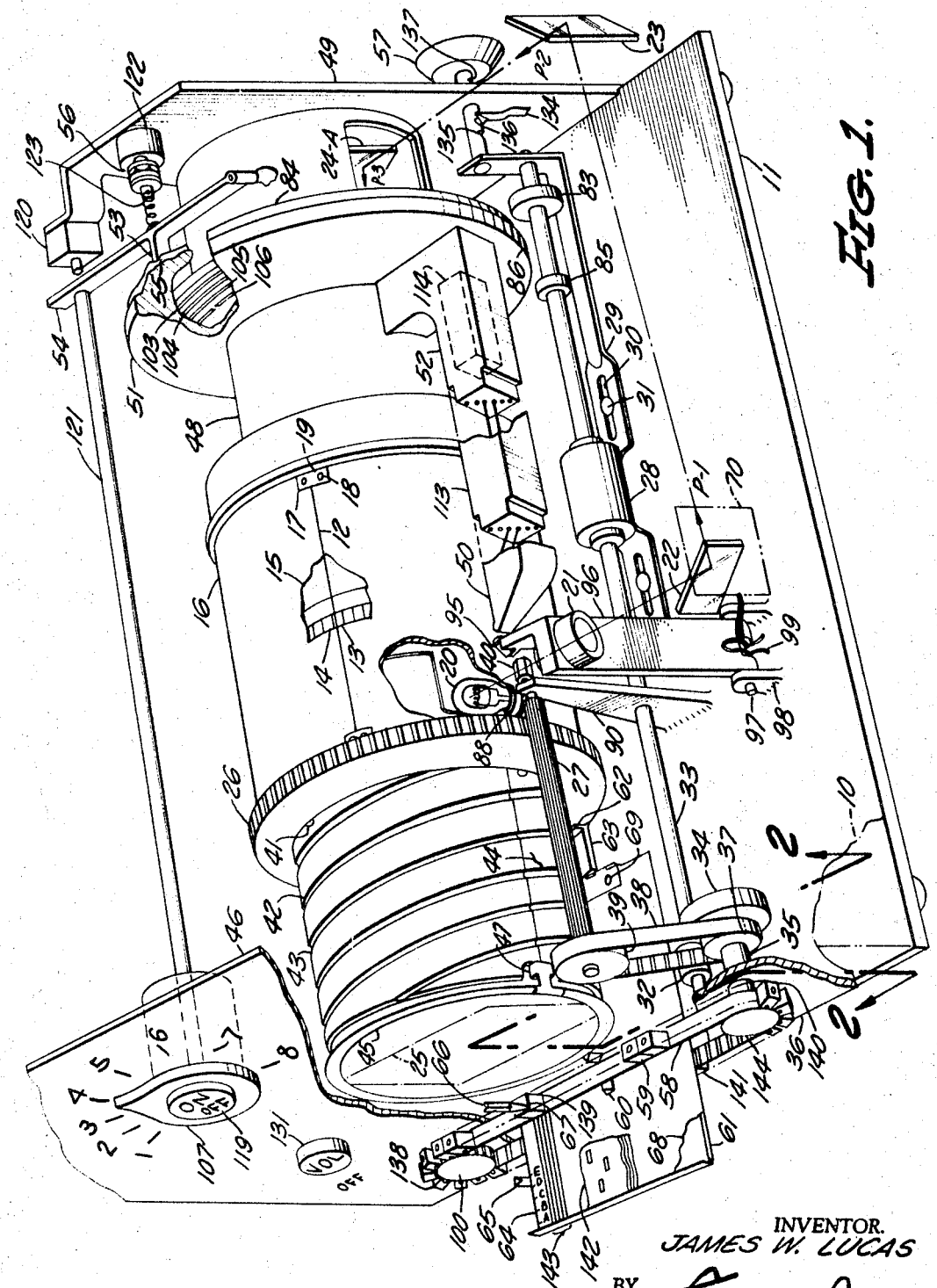

Again referring to the general arrangement shown in FIGURE 1, case 10, which encloses the entire device, is shown in phantom for clarity. The base portion 11 of case 10 provides the support for the mechanical and optical components. Film 12, normally flat, contains a series of picture elements 13 and 14, and sound recording area 15. This film is wrapped around transparent cylinder 16 and fastened by spring clamps 17, with plungers 18 engaging corner holes 19 in film 12, and serves to align picture elements 13 and 14 into a continuous spiral. These picture elements pass between projection lamp 20 and projection lens 21 so that an image travels along the optical path P–1 to P–3, is reflected by mirrors 22, 23 and 24–A, and is focused for viewing on screen 25, which forms the front face of case 10.

Projection lens 21 is kept at a constant distance from film 12 by roller 95, which is in contact with and senses the film surface and is disposed at a 45° angle to the cylinder axis and to the vertical. Roller 95 will therefore rotate whether cylinder 16 is moved rotationally or axially. Lens 21 and roller 95 are mounted to support arm 96, which is pivoted on shaft 97 and attached to base 11 by bracket 98. Torsion spring 99 presses roller 95 against film 12.

Transparent cylinder 16 has spur gear 26 attached along its forward edge and engaging pinion shaft 27. Electric motor 28 is slidably mounted to base 11 by brackets 29, with slots 30 engaging pins 31. In the intermediate position shown in FIGURE 1, friction roller 32, at the forward end of motor shaft 33, is in engagement with friction roller 34 on idler shaft 35, journalled in bracket 36 on base 11. Also mounted on idler shaft 35 are gear-belt drive wheels 37 and 144. Drive wheel 37 is connected by gear-belt 38 to gear 39 on pinion shaft 27. Thus, in the motor position shown, motor 28 rotates cylinder 16 at the constant speed. The projected image on viewing screen 25 is held stationary by octagonal prism 40, which is attached to pinion shaft 27 and deflects the light beam to compensate for the motion of picture elements 13 and 14 in the known manner. An example of this prism action is seen in U.S. Patent No. 2,498,580 of H. Roger, which is incorporated by reference herein.

Figure 2:
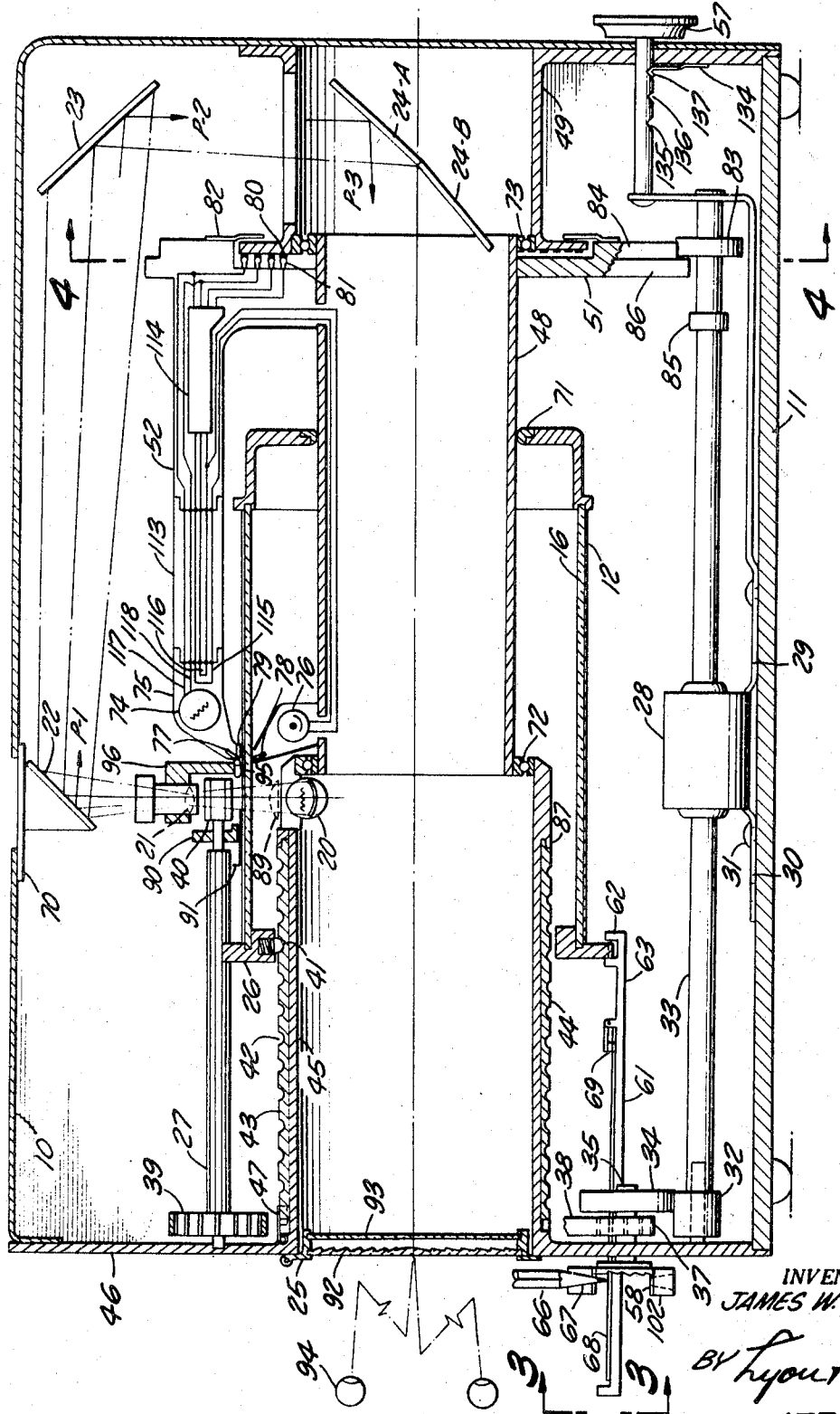
FIGURE 2 shows two half-sections taken along the lines 2—2 as indicated in FIGURE 1.

During the rotation of cylinder 16, it is urged into a helical path by spring-loaded balls 41 as they follow grooves 42 in replaceable shells 43 and 44, attached to cylindrical portion 45 of stationary bracket 46 mounted on base 11. Hinged locks 47 hold shells 43 and 44 in place. The aft end of cylinder 16 rides on the outer surface of rotatable opaque cylinder 48 in a manner best seen in FIGURE 2. Also best seen in FIGURE 2 are the support bearings through which cylinder 48 is attached to bracket 46 and to aft bracket 49 mounted on base 11. These details will be explained later.

A magnetic readout head 50 is shown in FIGURE 1, and so sound recording area 15 is magnetic in this instance. However, it is to be understood that any suitable sound readout means may be used. Flange 51 is attached to opaque cylinder 48 at its aft end and supports arm 52 which has readout head 50 removably mounted to its forward end through extension 113. As is better shown in FIGURE 2, arm 52 encloses pre-amplifier 114 and supports the aft end of extension 113. Readout head 50 can mount to the forward end of extension 113 or directly to arm 52, depending on the location of soundtrack 15.

With intermediate motor position shown in FIGURE 1, readout head 50 is held stationary by detent 53 on arm 54 pivoted on bracket 49, urged into engagement with seat 55 in flange 51 by compression spring 56. When push-button 119 is depressed, alternating off-on motor switch 120 is turned on by arm 54 when pushed by shaft 121. Since flange 51 is not being rotated, detent 53 re-engages seat 55 when push-button 119 is released.

When the rearward position of motor 28 is chosen by pulling knob 57 to seat leaf spring 134 in groove 135, friction roller 32 is moved out of engagement with roller 34 and gear-belt drive wheel 144 can then be rotated by moving gear-belt 58 horizontally. This gear-belt carries numbers 59 which correspond to picture element locations on the transparent cylinder, so that rotational random access is available when any chosen number 59 is aligned with index 60. Tray 61 has its aft end connected to channel 62 by extension 63. Channel 62 indexes over spur gear 26 on transparent cylinder 16, and motion of tray 61 causes cylinder 16 to move along its axis of rotation. Letters 64 on tray 61 correspond to axial locations of picture elements, providing axial random access when a chosen letter 64 is aligned with index 65.

Random access may be the function of programmed instruction, in which case gear-belt 58 is moved by inserting a pencil 66 into a chosen hole 67 in belt 58, and moving the pencil until it stops against index 60. This action simultaneously marks a line on a sheet of paper 68 held in tray 61 by pins 69, thus providing a record of student activity during the instruction.

When motor 28 is in this rearward position, audio information corresponding to randomly selected frames can be played by turning selector switch 107 to any of positions 2, 3, or 5 through 8. As will be explained in relation to FIGURES 4 and 5, these switch positions can select different portions of the audio information for playback. Position 4 can be used with the intermediate motor position shown in FIGURE 1, and detent 53 re-engages seat 55 in flange 51 in each case after push-button 119 is depressed.

Position 1 is used with motor 28 in the forward position. As shown in FIGURE 5, moving selector switch 107 to this position places solenoid 122 in the motor-switch circuit, so that depressing push-button 119 turns on motor switch 120 and retracts solenoid 122 to hold detent 53 open through tension spring 123. Flange 51 can then be rotated without engaging detent 53 each revolution. Pushing button 119 again turns off switch 120 and releases solenoid 122 so that detent 53 again contacts flange 51, but at a random position. Moving cylinder 16 axially places any soundtrack at the same rotational position so that picture and sound are still synchronized. Both cylinders 16 and 48 are prevented from rotating, since rollers 32 and 34 are in engagement, as well as roller 83 and flange 51. When a new position of selector switch 107 is chosen, the first pressing of push-button 119 causes detent 53 to again engage seat 55.

For alternate projection to an external screen, door 70 in case 10, to which is mounted mirror 22, may be slid out of optical path P–1 to allow the light beam to issue from the case.

Referring now to FIGURE 2, the aft end of cylinder 16 is seen to contact the outer surface of rotatable opaque cylinder 48 through a circular bronze sleeve 71. Cylinder 48 is supported by bearing 72 at its forward end and bearing 73 at its aft end. FIGURE 2 shows an alternate optical readout head composed of exciter lamp 74 mounted on base 75 which is removably attached to arm 52 through extension 113, and photocell 76 attached to cylinder 48. Mirrors 77 and 78 serve to reflect the light beam from exciter lamp 74 through optical soundtrack 79, which may be adjacent to picture elements 13 and 14, and redirect it back to photocell 76. Electrical signals are sent to the amplifier from the two alternate readout heads through slip-rings 80 mounted on bracket 49 by means of spring contacts 81. Connection from photocell 76 to pre-amplifier 114 is actually made within lamp base 75 by connectors 115 and 116. When alternate magnetic head 50 replaces lamp base 75, the readout head is connected only to the preamplifier, and the photocell contacts are left open. Lamp filament connections 117 and 118 are also left open when head 50 is used. Since extension 113 carries all six wires straight through, the same connections are made with or without the extension. A dust shield 82 is provided to keep this area clean.

The forward position of motor 28 is shown in FIGURE 2 with spring 134 engaging groove 137 so that friction roller 32 is driving cylinder 16 by contacting roller 34. At the same time large friction roller 83 at the aft end of motor shaft 33 is driving opaque cylinder 48 by contacting inner friction surface 84 on flange 51. The next aft position of motor 28 would be that shown in FIGURE 1 with spring 134 engaging groove 136, where rollers 32 and 34 are still in contact, but flange 51 is not touching either of the rear friction rollers. The furthest aft position of the motor 28 disconnects roller 32 from roller 34 and places small friction roller 85 on shaft 33 in contact with outer friction surface 86 on flange 51. Spring 134 is then in engagement with groove 135.

When different types of film 12 are used, different lead angles on grooves 42 may be required. This change is accomplished by sliding cylinder 16 to its furthest aft position and pulling hinged locks 47 away from shells 43 and 44. The shells are then pulled forward until their aft edges are out from under lips 87 of bracket 46. New shells are inserted and must be in the correct position before locks 47 can be closed. Upper and lower shells are not identical, so they cannot be inserted incorrectly.

Two-dimensional picture information on film 12 is projected as follows: projection lamp 20 mounted in socket 88 may have condensing lens elements 89 in front of it, but lamp shown in FIGURE 2 is self-contained parabolic reflector type and does not require them. Socket 88 is attached inside the cylindrical portion 45 of bracket 46. Viewing screen 25 is hinged to case 10 for easy replacement of projection lamp 20. The aft end of pinion shaft 27 is journaled in bracket 90, which is attached to base 11. A sliding mask 91 is attached to bracket 90, which is attached to base 11. A sliding mask 91 is attached to bracket 90 and would be blocking the forward half of the field of view of projection lens 21. With mask 91 in this position, half of mirrors 22 and 23 and mirror 24–A reflect the image-bearing light beam and direct it to viewing screen 25, where a converging Fresnel lens 92 and a diffusion screen 93 are in place.

If stereoscopic picture pairs are used on film 12, mask 91 is slid forward out of the field of view of projection lens 21, as shown and mirrors 22 and 23 reflect side-by-side images of the picture pair. However, mirrors 24–A and 24–B are at a slight angle to each other, and the picture image centerlines are redirected so that they effectively cross at the plane of viewing screen 25. In this mode of operation, diffusion screen 93 is removed, and Fresnel lens 92 becomes effective to selectively direct the image-bearing light rays into eyes 94 of an observer, when at the normal viewing distance. Thus, no supplementary equipment need be worn by the observer to separate the stereoscopic images. This operation can be applied to still pictures or to motion sequences with equal ease.

Figure 3:
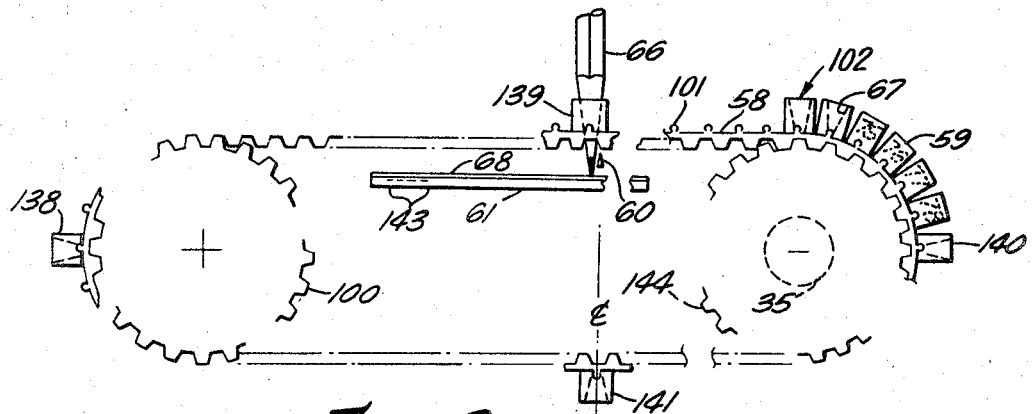
FIGURE 3 is a front view taken as shown by lines 3—3 in FIGURE 2.

FIGURE 3 shows a more detailed view of gear-belt 58, as it loops over drive-wheel 144 and idler-wheel 100. Belt 58 has cylindrical protrusions 101 on the outer surface which engage blocks 102 at their inner centerlines. Pencil 66 is inserted into a conical hole through any block 102 and through the gear-belt, so that the point marks a line on paper 68 in tray 61 while pencil 66 is moving over to stop against index 60. Blocks 102 serve to hold the pencil in a vertical position while it is moving the belt, but the blocks allow belt 58 to curve around drive-wheel 144 and idler-wheel 100 without becoming disconnected. Belt 58 forms a continuous loop of such a length that it makes one complete revolution for each rotation of cylinder 16. Each block 102 can therefore have a number 59 that corresponds to a definite position on the periphery of cylinder 16.

The upper surface of tray 61 is colored in a repetitive pattern 143 of red, blue, yellow and green stripes parallel to the cylinder axis. Thus, when paper 68 is replaced by a stack of differently punched cards 142, holes common to all cards allow the color on tray 61 to show through. Belt 58 has selected blocks 138 to 141 colored red, blue, yellow and green respectively. Placing appropriate block over the hole of the same color locates any desired frame.

Figure 4:
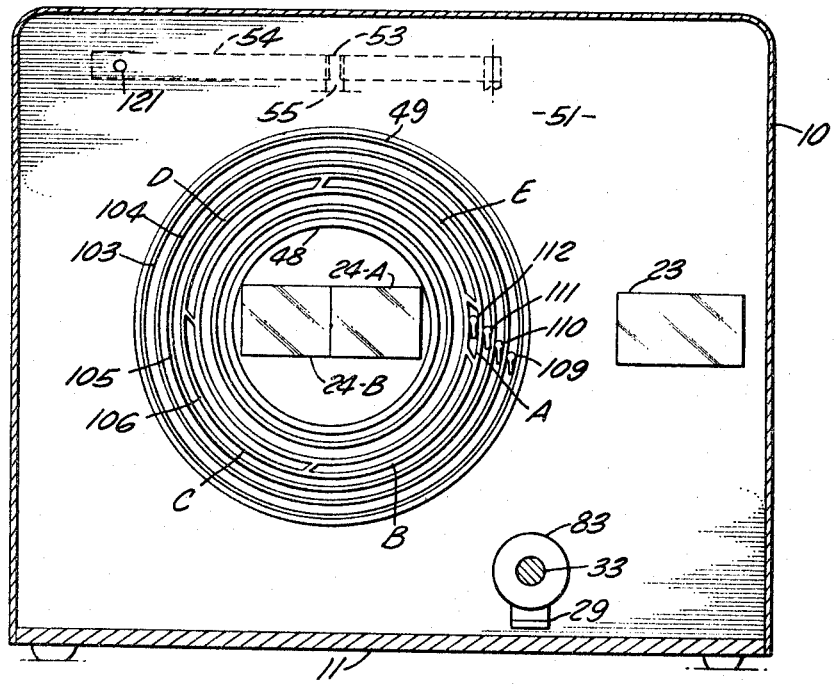
FIGURE 4 is a section looking aft as indicated generally by lines 4—4 in FIGURE 2.

The optical readout arangement is shown in FIGURE 4, as well as in FIGURE 2, and requires that two electrical input and two output rotary connections be provided. Four slip rings 80 are therefore attached to the forward face of bracket 49 and are held stationary at all times. Of these, the outer two rings 103 and 104 provide the power input connections for exciter lamp 74 and pre-amplifier 114 located in arm 52. The next two rings 105 and 106 comprise the output connections from preamplifier 114. All of rings 103 through 105 are continuous, but innermost ring 106, which carries the output signal from the pre-amplifier, is split into five sectors for selectively reading out portions of the soundtrack during each rotation of the readout arm. Ring 106 is divided into sector A, which is approximately 20° long, provides the normal rest position for the readout arm so that there is no readout during random cylinder manipulation and allows some rotational distance for the readout arm to get up to synchronous speed before its output becomes audible; sectors B through E each represent an 85° portion of audio information, separately readable by manipulation of a selector switch 107. Insulation between sectors is seen to be on an angle, so that adjacent ones can read continuously without audible cutoff. When cylinder 16 is driven and opaque cylinder 48 is held stationary, selector switch 107 is adjusted to connect sector A to amplifier 108 and to disconnect sectors B through E.

When alternate magnetic readout head 50 replaces lamp base 75, the outer two slip-rings 103 and 104 are connected only to pre-amplifier 114. Rings 105 and 106 provide the connections between amplifier 108 and preamplifier output, with sectors A through E performing the same function as described above.

As best seen in FIGURE 2, flange 51 on opaque cylinder 48 supports the aft end of arm 52. Spring contacts 81 are fastened to flange 51 at a point adjacent to the attachment point for arm 52, and act as rotating connectors to the various circuits through stationary slip-rings 80. The outer two contacts 109 and 110 are shown to connect to exciter lamp 74 and to pre-amplifier 114 through the aft end of arm 52. The next two contacts 111 and 112 are seen to connect to photocell 76, also through the aft end of arm 52.

The schematic circuit diagram shown in FIGURE 5 has all rotating elements grouped together and indicated within dotted area 124. Since replacement of optical sound lamp base 75 by magnetic head 50 automatically disconnects exciter lamp 74, an imaginary switch 125 is shown in the lamp circuit to simulate this effect. Master on-off switch 126 is shown in the main power line. Fuses, transformers, blower, etc. are omitted since the device could be workable without them.

Rotating arm 127 in selector switch 107 connects amplifier 108 and speaker 133 to various groups of slip-rings 80. The wide end of arm 127 is insulated from a metal extension strip 128, which serves only to connect points 129 and 130 when switch 107 is in position 1. This places solenoid 122 in the motor switch circuit. Extension 128 does not make contact with any other points in any position. The wide end of arm 127 rests across points connected to all five sectors of slip-ring 106, and provides audio information during the entire revolution of cylinder 48.

In position 2, the wide end of arm 127 connects sectors B through E to amplifier 108. This allows the readout head to be disconnected when in rest position A. In position 3, the wide end of arm 127 connects sectors B and C to amplifier 108. This permits readout during the first half-rotation from rest position A. Positions 4 through 8 connect individual sectors A then E through B respectively to the amplifier, through the narrow end of arm 127. Volume control 131 includes on-off switch 132 to disconnect the entire audio circuit for silent motion pictures or for teaching machine usage.

In order to comply with the statute, this invention has been described in considerable detail and in terms of one particular embodiment, but it is to be understood that these details and the nature of the embodiment itself are subject to variation and the invention therefore is not to be limited in scope except as may be indicated by the extent of the appended claims.

I claim:

1. A motion picture display device comprising a case, a fixed cylinder supported by said case and containing at least one helical track, a transparent rotatable cylinder concentric with said fixed cylinder and capable of supporting pictorial information, means attached to said rotatable cylinder effective to urge it along the path of said helical track, a shaft adjacent the wall of said rotatable cylinder and substantially parallel to the centerline thereof, a prism-type shutter attached to said shaft, a light source affixed interiorly of said case, a projection lens adjacent said shutter and supported by said case, and means for rotating said shutter and said transparent cylinder so that their adjacent surfaces move in the same direction, said transparent cylinder being so disposed that one wall of said cylinder passes between said light source and said projection lens.

2. The invention in claim 1, further including a projection lens holder movably supported by said case and a follower adjacent said lens and mounted on said holder, said follower maintaining contact with said pictorial information on said transparent cylinder during rotation of said cylinder.

3. The invention in accordance with claim 1, further including a viewing screen mounted on said case, and at least two planar reflectors affixed interiorly of said case, wherein a light beam, issuing from said light source and passing through said projection lens, is redirected by said planar reflectors to approach said viewing screen from inside said fixed cylinder substantially along the rotational axis thereof.

4. The invention in accordance with claim 3, further including a third planar reflector affixed interiorly of said case, said viewing screen comprising a converging lens element of a focal length effective to concentrate said light beam into the eye of an observer at the normal viewing distance from said viewing screen, two of said planar reflectors being so disposed that two adjacent portions of related information contained within said light beam are substantially juxtaposed in the plane of said viewing screen, said converging lens element thereby being effective to carry said two portions of information separately to two eyes of an observer at said normal viewing distance.

5. The invention in accordance with claim 3, wherein said fixed cylinder comprises at least two removable semicylindrical portions containing said helical track and further including attachment means cooperating with said removable portions to prevent incorrect installation thereof onto said cylinder.

6. The invention in accordance with claim 3, further including means for selectively placing individual portions of said pictorial information in the path of said light beam, said means comprising a member movable only in a direction substantially parallel to the axis of said rotatable cylinder and slidably engaging a flange on said cylinder, and a flexible belt movable only in a direction substantially perpendicular to the axis of said cylinder, said belt being so connected to said cylinder that each revolution of said belt corresponds to one revolution of said cylinder.

7. The invention in claim 6, wherein said movable member includes a tray for holding paper, and wherein said flexible belt includes means whereby a stylus can be inserted to move said belt while said stylus is marking a line on said paper.

8. The invention in claim 7, wherein said belt means comprises a series of perforated blocks individually pivotally mounted to the exterior of said belt.

9. The invention in claim 8, wherein the upper surface of said tray is striped in a recurring series of colored lines and wherein certain of said perforated blocks are identified with colors to match those of said lines on said tray.

10. A device for projecting transparent pictures onto a viewing screen comprising a case, a fixed cylinder supported by said case and containing at least one helical track, a transparent rotatable cylinder concentric with said fixed cylinder and capable of supporting pictorial and auditory information, means attached to said rotatable cylinder effective to urge it along the path of said helical track, a light source affixed interiorly of said case, a projection lens adjacent one wall of said transparent cylinder and supported by said case, a second rotatable member concentric with said transparent cylinder and supported by said case, a sound reproducing arm mounted on said second rotatable member, a driving flange attached to said member, and motor means effective to rotate said member independently of said transparent cylinder.

11. The invention in claim 10, wherein said motor means includes a shaft and driving wheel attached thereto adapted to rotate said transparent cylinder, and adjustment means whereby said transparent cylinder and said second rotatable member can be rotated either together or separately.

12. The invention claim 10, wherein said sound reproducing arm includes a removable extension section and means for interchangeably mounting optical or magnetic readout elements to said arm.

13. The invention claim 12, wherein said means for interchangeable mounting include location of electrical contacts whereby replacement of said readout elements effects the required changes in the electrical circuits for said elements.

14. The invention in claim 10, further including at least two arcuate electrical conductors and at least two contact arms mounted between said case and said second rotatable member, said arms cooperating with said conductors to transmit a signal from said sound reproducing arm during relative motion between said transparent cylinder and said member.

15. The invention in claim 14, wherein at least one of said arcuate electrical conductors is divided into at least two parts, one of said parts being electrically connected to one of said contact arms during rotation of said transparent cylinder, and another of said parts being contacted by said arm during rotation of said second rotatable member.

16. The invention in claim 15, further including a selector switch electrically connected to said arcuate conductors, whereby small areas of said parts may be selected to carry said signal from said sound reproducing arm independently from other areas of said parts.

17. The invention in claim 14, further including a retractable stop supported by said case and effective to arrest the motion of said second rotatable member at a repeatable location during each rotation of said member.

18. The invention in claim 10, further including a selector switch and a retractable stop adapted to arrest the motion of said second rotatable member, adjustment of said selector switch for motion of said member beyond one rotation being effective to render said retractable stop inoperative.

References Cited

UNITED STATES PATENTS

| | | | |
|---|---|---|---|
| 1,116,377 | 11/1914 | Bolam et al. | 352—101 |
| 1,641,727 | 9/1927 | Bradford | 352—101 |
| 2,200,953 | 5/1940 | Fleischer et al. | 352—101 |
| 2,378,416 | 6/1945 | Like | 88—28 |
| 2,977,124 | 3/1961 | Staar | 274—9.1 |
| 3,259,449 | 7/1966 | Barocela | 352—119 |

NORTON ANSHER, *Primary Examiner.*

MONROE H. HAYES, *Assistant Examiner.*

U.S. Cl. X.R.

352—32, 119; 353—18